Dec. 11, 1945. S. A. SCHERBATSKOY 2,390,965
CENTRAL ELECTRODE SUPPORT
Filed April 20, 1944 2 Sheets-Sheet 1
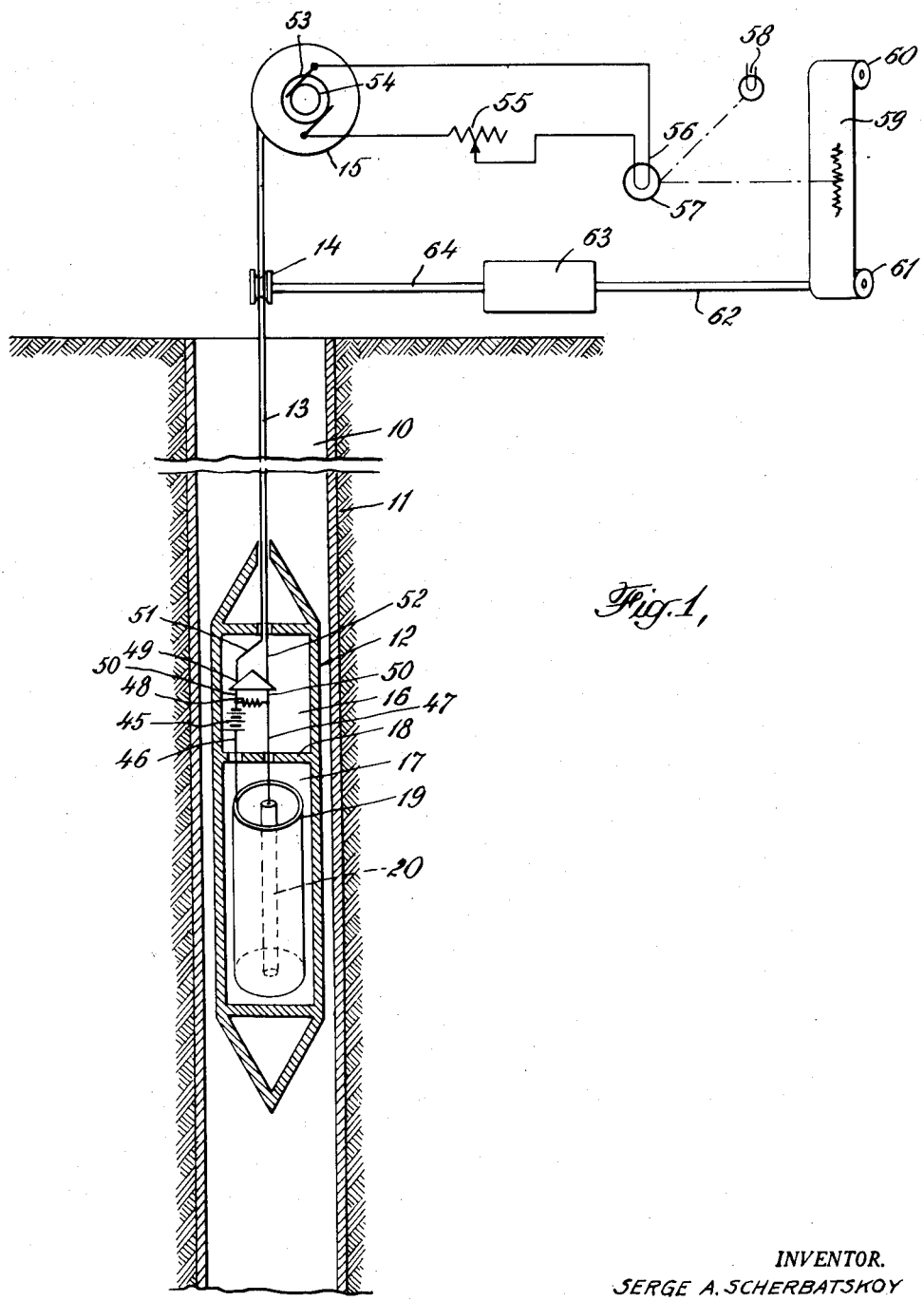
Fig.1,
INVENTOR.
SERGE A. SCHERBATSKOY
BY
*James Y. Cleveland*
ATTORNEY.

Dec. 11, 1945. S. A. SCHERBATSKOY 2,390,965
CENTRAL ELECTRODE SUPPORT
Filed April 20, 1944 2 Sheets-Sheet 2
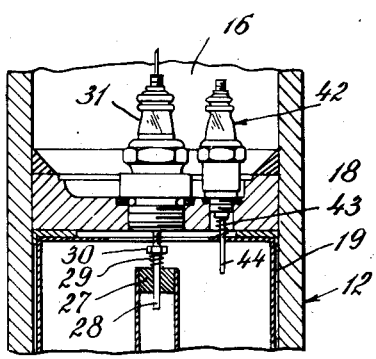
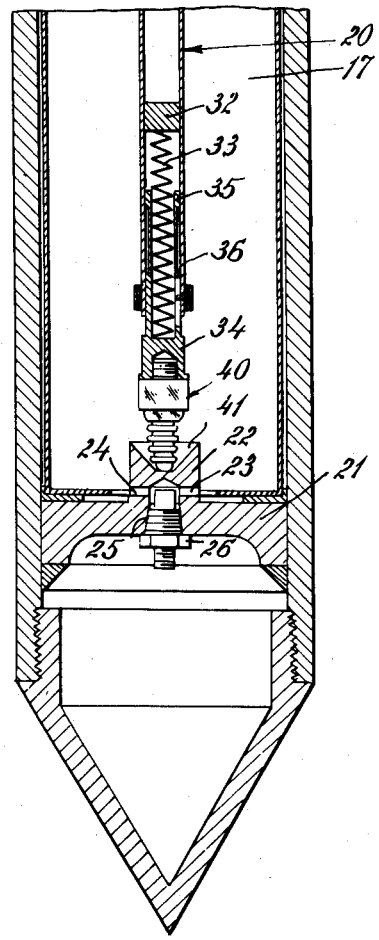
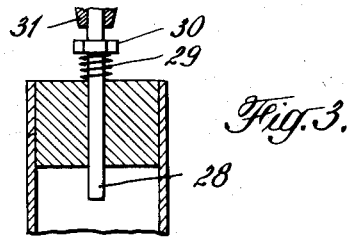
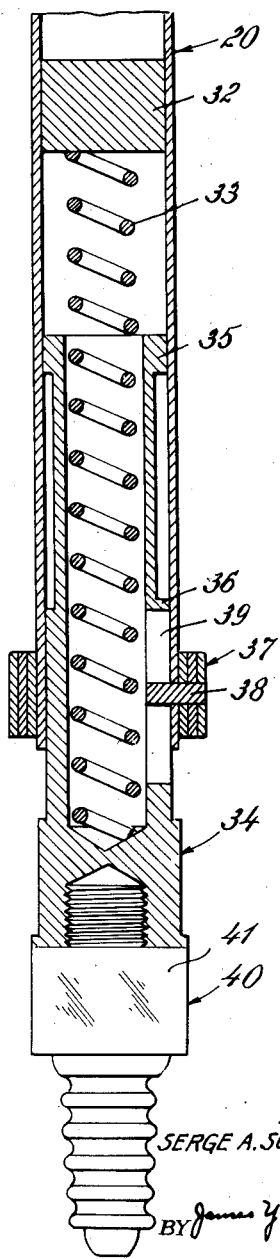
INVENTOR.
SERGE A. SCHERBATSKOY
BY James Y. Cleveland
ATTORNEY.

Patented Dec. 11, 1945

2,390,965

UNITED STATES PATENT OFFICE 2,390,965

CENTRAL ELECTRODE SUPPORT

Serge Alexander Scherbatskoy, Tulsa, Okla., assignor to Well Surveys, Incorporated, Tulsa, Okla., a corporation of Delaware Application April 20, 1944, Serial No. 531,913

5 Claims. (Cl. 250—83.6)

This invention relates to the art of geophysical prospecting and more particularly to apparatus adapted for use in a system of surveying drill holes by methods which depend upon the detection and measurement of the intensity of radioactive radiations.

A number of devices are known in the art for the detection of radioactive radiations such as ionization chambers and Geiger-Mueller counters. Of the above, the one most favored is the ionization chamber because of its efficiency in detecting the rays and because it will produce a substantially continuous current output which varies in intensity in accordance with the intensity of the radiations detected.

Ionization chambers generally consist of a housing having concentrically disposed electrodes mounted therein out of contact with the inner walls of the housing. These electrodes are disposed within an ionizable medium such as argon, hydrogen, etc., preferably under super-atmospheric pressure whereby ionization of the medium will occur to form a conductive path between the electrodes when a potential is placed across the electrodes. For purposes of surveying drill holes the housing containing the ionization chamber is usually divided into at least two compartments, one containing the ionization chamber and another, sealed therefrom, containing the auxiliary apparatus necessary for amplifying signals resulting from the detection of radioactive radiations; a source of potential for the electrodes in the ionization chamber; and means for transmitting the amplified signals to the conductors joining the housing which extend therefrom to the surface of the earth to recording equipment where the signals can be recorded in correlation with the depth at which they are detected.

This invention is specifically directed to improvements in the manner of supporting the central electrode in the ionization chamber. A number of ways for supporting the central electrode have been used heretofore. It is well known that great mechanical stability is required in maintaining the relative position of the electrodes, any relative movement causing strong capacity displacement currents that can easily override the signal to be measured, a motion of the order of only a few hundredths of an inch being usually not tolerable. Some of them rigidly support the central electrode in its position while others form a resilient support for the electrode. In both forms of support used prior to the present invention it has been necessary to use insulating rods formed of material such as quartz as a main support. Due to the brittleness of such material, considerable difficulty has been experienced by the field crews in using the apparatus involving such supports because the apparatus, of necessity, is subjected to rough handling which, in many instances, fractures the fragile rod, thereby necessitating returning the ionization chamber to the shops for a replacement. Furthermore, because of the hardness and lack of elasticity of the materials used it is very difficult to prevent the occurrence of mechanical play. Frequently, this play appears after the instrument has been subjected to mechanical shocks or after the instrument has been subjected to temperature cycles encountered in the logging operation, since the subsurface temperatures frequently reach 200° F.

The disadvantages enumerated above, and others inherent in support of that character, have been overcome by the present invention by the provision of a novel resilient mounting for the central electrode that utilizes an element which has been formed from a standard internal combustion engine spark plug by removing the central conductor therefrom and machining the outer metal casing of it to adapt it to this particular use. The specific details of this feature will be discussed later in the specification.

Therefore, the primary object of the present invention resides in the provision of novel means for resiliently supporting the central electrode of a ionization chamber that will be sufficiently sturdy that it will withstand shocks such as those occasioned by handling the apparatus in transportation or in actual use in detecting radioactivity and which will be capable of immediately nullifying any mechanical play or looseness that may become introduced.

Still another object of the present invention resides in the provision of a resilient support for the central electrode that is so constructed that it will maintain its fixed position relative to the outer electrode and inner wall of the ionization chamber.

This invention further contemplates the provision of a tubular central electrode having disposed in the lower end thereof resilient means adapted to operate in conjunction with a sturdy support therefor to resiliently support the central electrode.

Other objects and advantages of the present invention will become apparent from the following detailed description when considered with the drawings in which:

Figure 1 is a diagrammatic illustration of a well surveying operation showing diagrammatically the detecting apparatus disposed within a drill hole and connected by electrical conductors to conventional recording apparatus located at the surface of the earth;

Figure 2 is an enlarged sectional view of the ionization chamber showing the relationship between the electrodes as well as between the electrodes and the ionization chamber housing, and Figure 3 is an enlarged vertical section of the central electrode showing the details of the novel support forming the subject matter of this application.

Referring to the drawings in detail, particularly Figure 1, there is shown a drill hole 10 penetrating the strata of the earth's surface. Although a casing 11, usually formed of iron or steel, is shown, it is not essential to the operation of the apparatus forming the subject matter of this application. Disposed within the casing 11, and adapted to be lowered or raised therein, is a capsule or housing 12 that is supported by a cable 13 which extends over a measuring wheel 14, located at the surface, to a drum 15 on which it is wound or from which it is unwound when the capsule is raised or lowered in the hole, respectively.

The capsule or casing 12 is divided into an upper compartment 16 and a lower compartment 17. The lower compartment contains an ionization chamber that is defined by the inner walls of the housing 12, the bottom thereof, and the partition 18 that separates the upper and lower compartments. The ionization chamber thus formed contains an ionizable medium such as argon for the detection of gamma rays and such as hydrogen for the detection of neutrons. There are concentrically disposed in the ionizable medium within the ionization chamber two electrodes, an outer cylindrical electrode 19, and a central electrode 20. Although the central electrode 20 may be a conductive metal in the form of a solid rod, it is usually made of tubular material. For purpose of illustrating the present invention it is shown formed of tubular material, it being understood that the lower end of a solid electrode could be drilled along its axis to provide a chamber for the elements of the support to be described hereafter. The arrangement of the electrodes with respect to the inner wall of the housing 12 is shown in enlarged detail in Figure 2.

The bottom 21 of the ionization chamber is provided with a support 22 for the central electrode 20. Support 22 is made integral with the bottom and is provided with passageways 23 and 24 that connect the ionization chamber to an orifice formed in the center of the bottom 21. There is disposed in the orifice 25 in threaded engagement therewith a valve 26 by means of which the ionization chamber can be charged with the ionizable medium.

The tubular central electrode 20 has secured in its upper end a plug 27 adapted to make electrical connection with the inner walls thereof. The plug 27 is provided with an axial opening to receive a conductor 28. Electrical connection between conductor 28 and plug 27 is insured by the spring 29 and the nut 30. The conductor 28 is the central electrode of the pressure plug 31, through which an electrical connection is made to the compartment above the ionization chamber.

The tubular electrode 20 is provided with a second plug 32 that is fixed to the inner walls of the tube 20 at a point spaced from the bottom end thereof. Plug 32 forms a stop against which one end of a coil spring 33 is adapted to press. The other end of the coil spring bears against a sliding element 34 that telescopically fits within the tube 20. The telescoping portion of element 34 is provided with a central bore to receive the bottom end of the spring 33. The outer surface of the telescoping portion of element 34 carries shoulders 35 and 36 that are adapted to slidably engage the inner wall of the tube 20 and form bearing surfaces which act as guide members for the telescoping portion of element 34. The bottom end of electrode 20 is provided with a triple spring detachable clamp 37 which carries a pin 38 that is adapted to extend through a hole in the tubular electrode 20 into an elongated opening 39 in the telescoping portion of element 34. The bottom end of element 34 threadedly engages an insulating support 40 in the form of a conventional spark plug from which has been removed the central electrode. The outer surface of the metal portion 41 of the support 40 is machined to substantially the same outside diameter as the outside diameter of the tube 20. The bottom end of the insulating support 40 rests in a seat 41 formed in the support 22.

When the capsule is subjected to movement such as shocks the ability of element 34 to move within the tube 20 against the action of the spring 33 provides a resilient support for the bottom end of the central electrode that will maintain the electrode at all times in central alignment and properly spaced concentrically from the outer cylindrical electrode 19 and the inner wall of the ionization chamber.

The outer cylindrical electrode 19 is electrically connected to apparatus contained in the upper chamber of the capsule through the medium of a second pressure plug 42. Pressure plug 42, like pressure plug 31, is in the form of a spark plug which has had its outer electrode removed. The central electrode of plug 42 makes electrical connection with the ionization chamber electrode 19 through the medium of the spring 43 and the conductor 44.

The upper compartment 16 is shown containing a source of potential 45 for the electrode circuit which comprises the conductors 46 and 47, the resistance 48 and the electrodes 19 and 20. There is also disposed in the upper compartment an amplifier 49 that is adapted to amplify voltages developed across the resistance 48 as a result of current flowing in the ionization chamber circuit. The amplifier 49 is connected across the resistor 48 by means of conductors 50. The output of the amplifier 49 is connected through conductors 51 and 52 to conductors carried by the cable 13 by means of which the amplified signals are transmitted to the surface.

The conductors within the cable 13 are connected by means of slip rings 53 and 54, carried by the drum 15, through a variable resistance 55 across the input terminals of the recorder. For purpose of illustration there is shown in Figure 1 a recorder of the galvanometer type comprising the moving element 56 which carries a mirror 57. Light from a source 58 is reflected from the mirror 57 onto a moving photographic film or sensitized paper 59. The moving film or sensitized paper 59 is supplied from a feed roll 60 to a take-up roll 61 which is driven by the shaft 62. Shaft 62 is connected through the gear box 63 to a second shaft 64. The shaft 64 is driven by the measuring wheel 14 over which the cable passes when being lowered into the well or withdrawn therefrom. Although there is illustrated a gear box for connecting the measuring wheel to the take-up roll 61 of the recorder, it is obvious to those skilled in the art that a Selsyn system can be used for this purpose.

In operation, currents produced in the ionization chamber as a result of subjecting the ionizable medium therein to radioactive radiations, flow through the resistance 48 resulting in an IR drop across this resistance. This IR drop is impressed upon the input of the amplifier 49. Currents thus caused to flow in the input circuit of the amplifier are amplified by the amplifier 49 and conducted to the surface through the conductors in the cable 13 where they are recorded in correlation with depth.

It is to be understood that additional amplification can be employed on the surface after the signals have been taken off the slip rings 53 and 54 if desirable.

I claim:

1. An ionization chamber adapted for use in detecting radioactivity comprising in combination a housing, an ionizable medium in said housing, a pair of cylindrical electrodes disposed in said ionizable medium within the housing, separate means for supporting the electrodes in concentric relationship, means forming electrical connection with said electrodes and extending outside of said housing, said means for supporting the central electrode comprising an element adapted to telescopically fit within the bottom of the central electrode, annular shoulders on said element adapted to slidably engage the inner wall of the electrode and serve as a guide when the element and electrode are moved relative to each other, means for limiting the movement of the element relative to the electrode, resilient means disposed within said central electrode and the telescoping element adapted to exert outward pressure on the telescoping element, and an insulator carried by the bottom end of the telescoping element adapted to support the telescoping member and central electrode resiliently supported thereby, whereby mechanical play imparted to the ionization chamber will be absorbed by the resilient means.

2. An ionization chamber adapted for use in detecting radioactivity comprising in combination a housing, an ionizable medium in said housing, a pair of electrodes disposed in said ionizable medium within the housing, separate means for supporting the electrodes in concentric relationship, means forming electrical connection with said electrodes and extending outside of said housing, said means for supporting the central electrode comprising an element adapted to telescopically fit within the bottom of the central electrode, annular shoulders on said element adapted to slidably engage the inner wall of the electrode and serve as a guide when the element and electrode are moved relative to each other, detachable means for limiting the movement of the element relative to the electrode, resilient means disposed within said central electrode and the telescoping element adapted to exert outward pressure on the telescoping element, and an insulator carried by the bottom end of the telescoping element adapted to support the telescoping member and central electrode resiliently supported thereby, whereby mechanical play imparted to the ionization chamber will be absorbed by the resilient means.

3. In an electrometer adapted for use in making a radioactivity survey of a drill hole having a housing, means dividing the housing into two compartments, an upper compartment and a lower compartment, an ionizable medium in said lower compartment, a pair of concentrically disposed cylindrical electrodes in said ionizable medium, means for electrically connecting said electrodes to elements contained in the upper compartment to form an electrode circuit, said elements including a source of potential for the electrodes and an amplifier for amplifying signals produced in the electrode circuit and means for conducting the signals from the amplifier to a point outside the housing, the improvement which comprises means for resiliently supporting the central cylindrical electrode, said means comprising an element adapted to telescopically fit within the bottom end of said electrode for sliding engagement therewith, means for limiting the relative movement of the electrode and telescoping element, resilient means within said electrode and telescoping element adapted to exert an outward force against the telescoping element and an insulator carried by the outer end of said telescoping element adapted to form a support for the telescoping element and the electrode resiliently carried thereby, whereby mechanical play imparted to the central electrode will be absorbed by the resilient means.

4. An ionization chamber adapted for use in detecting radioactivity comprising in combination a housing, an ionizable medium in said housing, a pair of cylindrical electrodes disposed in said ionizable medium within the housing, separate means for supporting the electrodes in concentric relationship, means forming electrical connection with said electrodes and extending outside of said housing, said means for supporting the central electrode comprising an element adapted to telescopically engage the bottom of the central electrode, means on said element adapted to slidably engage the electrode and serve as a guide when the element and electrode are moved relative to each other, means for limiting the movement of the element relative to the electrode, resilient means adapted to exert outward pressure on the telescoping element, and an insulator carried by the bottom end of the telescoping element adapted to support the telescoping member and central electrode resiliently supported thereby, whereby mechanical play imparted to the ionization chamber will be absorbed by the resilient means.

5. In an electrometer adapted for use in making a radioactivity survey of a drill hole having a housing, means dividing the housing into two compartments, an upper compartment and a lower compartment, an ionizable medium in said lower compartment, a pair of concentrically disposed cylindrical electrodes in said ionizable medium, means for electrically connecting said electrodes to elements contained in the upper compartment to form an electrode circuit, said elements including a source of potential for the electrodes and an amplifier for amplifying signals produced in the electrode circuit and means for conducting the signals from the amplifier to a point outside the housing, the improvement which comprises means for resiliently supporting the central cylindrical electrode, said means comprising an element adapted to telescopically engage the bottom end of said electrode for sliding engagement therewith, means for limiting the relative movement of the electrode and telescoping element, resilient means adapted to exert an outward force against the telescoping element and an insulator carried by the outer end of said telescoping element adapted to form a support for the telescoping element and the electrode resiliently carried thereby, whereby mechanical play imparted to the central electrode will be absorbed by the resilient means.

SERGE ALEXANDER SCHERBATSKOY.